United States Patent [19]  [11] Patent Number: 5,466,016
Briody et al.  [45] Date of Patent: Nov. 14, 1995

[54] SOLDERLESS FILLER NECK JOINT

[75] Inventors: Paul P. Briody, Grand Blanc; Randy C. Cable, deceased, late of Flint, both of Mich., by Lori A. Cable, legal representative

[73] Assignee: General Motors Corporation, Detroit, Mich.

[21] Appl. No.: 225,680

[22] Filed: Apr. 11, 1994

[51] Int. Cl.$^6$ .................................................. F16L 5/00
[52] U.S. Cl. ........................ 285/204; 285/352.5; 29/523; 220/86.2; 277/178
[58] Field of Search ................................. 285/222, 205, 285/153, 154, 204, 382, 382.5; 220/86.1, 86.2; 29/522.1, 523; 277/178, 207 A

[56] References Cited

U.S. PATENT DOCUMENTS

| | | | |
|---|---|---|---|
| 1,644,154 | 10/1927 | Schriner | 29/523 |
| 1,875,908 | 9/1932 | Zarobsky . | |
| 1,947,915 | 2/1934 | Marschall | 221/27 |
| 2,100,168 | 11/1937 | Melrath | 285/49 |
| 2,133,852 | 10/1938 | Dillhoefer | 285/49 |
| 2,339,255 | 1/1944 | Dodson | 285/49 |
| 2,409,532 | 10/1946 | Bentley et al. | 220/86 |
| 2,466,076 | 4/1949 | Bentley et al. . | |
| 2,772,034 | 11/1956 | Richmond, Jr. | 285/921 X |
| 2,779,498 | 1/1957 | Cole et al. | 220/86 |
| 2,797,955 | 7/1957 | Wilfert | 285/921 X |
| 2,798,742 | 7/1957 | Parish, Jr. et al. | 285/45 |
| 3,118,124 | 1/1964 | Bleckmann | 29/523 X |
| 3,243,012 | 3/1966 | Powers | 181/72 |
| 3,358,357 | 12/1967 | DeFauw | 29/510 |
| 3,390,738 | 7/1968 | Kirsch et al. | 181/61 |
| 3,448,892 | 6/1969 | Thieman | 220/86 |
| 4,027,910 | 6/1977 | Farelli | 220/86.2 X |
| 4,088,241 | 5/1978 | Hall et al. | 220/86 R |
| 4,122,968 | 10/1978 | Germain | 220/86 R |
| 4,171,750 | 10/1979 | Hundemer | 220/86.2 |
| 4,185,844 | 1/1980 | Hubbard et al. | 280/5 A |
| 4,323,166 | 4/1982 | Maeroff | 220/86 R |
| 4,334,703 | 6/1982 | Arthur et al. | 285/222 |
| 4,379,574 | 4/1983 | Leichtl | 285/211 |
| 4,405,256 | 10/1983 | King, Jr. | 29/523 X |
| 4,462,620 | 7/1984 | Bambenek et al. | 285/162 |
| 4,547,942 | 10/1985 | Fukuda | 29/157 R |
| 4,653,660 | 3/1987 | Shaw | 220/86 R |
| 4,679,698 | 7/1987 | Thorn et al. | 220/86 R |
| 4,690,293 | 9/1987 | Uranishi et al. | 220/86 R |
| 4,759,459 | 7/1988 | Bailey et al. | 220/86 R |
| 4,854,417 | 8/1989 | Uesugi et al. | 181/272 |
| 4,915,249 | 4/1990 | Anhegger et al. | 220/86 R |
| 4,955,950 | 9/1990 | Selichi et al. | 141/46 |
| 4,995,433 | 2/1991 | Beicht et al. | 141/312 |
| 5,042,678 | 8/1991 | Munguia | 220/254 |
| 5,069,260 | 12/1991 | Shea | 141/292 |
| 5,111,858 | 5/1992 | Aittama et al. | 141/312 |
| 5,253,773 | 10/1993 | Choma et al. | 230/86.2 |

FOREIGN PATENT DOCUMENTS 1429566  3/1976  United Kingdom ................ 285/222

Primary Examiner—Randolph A. Reese
Assistant Examiner—Heather Chun Shackelford
Attorney, Agent, or Firm—Jeffrey A. Sedlar

[57] ABSTRACT

A solderless fuel tank filler neck joint including a resilient seal interposed between a flanged opening in the fuel tank and a filler pipe. The seal is compressed between the filler neck and the flange by mechanical deformation of the pipe after it is inserted through the flanged opening. Mechanical deformation pulls the seal into a mating pocket surrounding the opening compressing an annular bead formed on the seal thereby providing a resilient secure leak tight joint.

8 Claims, 3 Drawing Sheets

SOLDERLESS FILLER NECK JOINT

BACKGROUND OF THE INVENTION

This invention relates to a tank assembly and more particularly to a mechanically sealed joint used to connect a filler pipe to a fuel storage tank.

Automotive fuel tanks are commonly mounted such that they are concealed from above by the vehicle's body. Therefore, a filler pipe is generally routed from the surface of the body to the tank itself. The filler pipe begins as a separate component that is attached to the tank at the pipe's filler neck thereby forming a fuel tank assembly. The filler pipe may be one piece or an assembly of components with the filler neck attached to the fuel tank and the remainder of the filler pipe assembly attached to the filler neck.

Also included in a fuel tank assembly is generally a vent pipe that conveys air from the tank during refueling. The vent pipe may be integral with the fill pipe or may be separately attached to the fuel tank in a manner similar to that by which the filler pipe is attached. A fuel tight seal must be provided at the joint between the pipes and the fuel tank to avoid leaks.

The predominant method of providing a seal at the filler neck joint is to extend the neck of the filler pipe through an opening in the fuel tank and solder the adjoining material of the two components to form an assembly. Generally a lead-tin material is used to solder the joint. The filler neck may be provided with a lead-tin coating or the like to obtain a secure solder joint and provide corrosion resistance.

With soldered construction, a clean metal surface on the tank and filler neck must be provided at the joint. The tank generally has a corrosion resistent coating on the base metal that may have to be removed in the area to be soldered. A problem with removing the coating is that the corrosion resistance aspect is defeated by exposing the base metal. Therefore a reapplication of additional corrosive resistant material may be required to obtain an acceptable corrosion free life expectancy from the assembly.

When an alcohol such as methanol is used as a fuel the typical lead-tin solder may be incompatible with the fuel and cannot be used in the fuel tank assembly. In such situations a solder and filler neck comprised of alternative materials may be required adding expense to the tank and filler pipe assembly when using a solder joint. Alternative, more expensive materials may also be used when preferable to reduce the use of lead in soldered joint construction.

Another method of connecting a filler pipe to a fuel tank involves the use of a resilient grommet. In this type of assembly the grommet is inserted into an opening in the fuel tank and then the filler neck is clamped or fastened to the grommet. The resiliency of the grommet allows it to deform and may permit movement of the filler pipe relative to the tank.

The above described assembly techniques provide advantages that are desirable. A soldered joint provides a leak tight seal with a high resistance to separation. A grommet joint provides a leak tight seal with resiliency and ease of assembly. Both assemblies have been used successfully in automotive applications. However, there remains a need for a durable, easily assembled filler neck joint that performs with a wide range of vehicle fuels and preserves the corrosion resistive integrity of the component parts.

SUMMARY OF THE INVENTION

An improvement in joining filler pipes to fuel tanks would be realized if the separation resistance characteristics of a soldered joint could be combined with the resiliency and assembly ease of a grommet joint to provide a leak tight seal. It is essential that the joint be compatible with gasoline. Preferably, the construction is also compatible with alcohol used in systems carrying alcohol or alcohol-gasoline blends. It is also preferable that the joint permits some variance in the roundness and size of the filler neck and tank opening components of the assembly and does not require the removal of corrosion resistive coatings protecting the fuel tank and the filler neck.

The present invention addresses the need for a more versatile joint in the construction of fuel filler neck assemblies. A leak tight seal is provided that eliminates the need to use solder and solder compatible coatings yet provides a durable connection with good resistance to separation or leak formation. The joint comprises an easily assembled construction with few component parts. Additional benefits include compatibility with alcohol and alcohol-gasoline blends and seal reliability over a wider tolerance range of tank opening size and filler neck roundness.

The fuel tank assembly according to the present invention includes a tank preferably fabricated from sheet metal having an opening in a tank wall to accept a filler pipe's neck. A flange with an integral ledge is preferably formed around the opening inside the tank wall. The flange provides increased strength in the area of the opening. The flange ends in a terminal edge inside the tank. The tank and filler neck are preferably coated with an inexpensive corrosion resistive coating such as paint or other protective materials.

The filler pipe's neck extends through the opening in the tank. An annular bead or flange projecting radially outward is formed in the pipe wall and serves as a stop. This stop bead in the filler neck cooperates with the tank wall to prevent the filler pipe from moving into the tank beyond its assembled position. An annular lock bead projects radially outward and is formed in the pipe wall inside the tank. The lock bead prevents the filler pipe from moving out of the tank beyond its assembled position. Together, the stop bead and the lock bead provide the sole means for securely locking the filler pipe to the tank with an interpositioned seal.

The cross section of the filler neck is designed to fit within the tank opening with enough clearance to allow the placement of a seal between the tank opening and the pipe. The seal preferably exhibits an annular configuration with an L-shaped cross section and nests within the tank wall opening at the preferred ledge. The seal is preferably made of nitrile rubber or a material with similar permeability characteristics. This material exhibits the required resistance to fuels typically stored in vehicle tanks.

The filler pipe's stop bead contacts one leg of the seal near the outside surface of the tank wall when the filler neck is inserted into the tank opening. After insertion the lock bead is formed around the fill pipe inside the tank wall. Formation of the lock bead pulls the stop bead against the seal and compresses the seal against the ledge around the interior of the tank opening. The formed lock bead preferably contacts the terminal edge of the flange giving the joint enhanced sealing characteristics.

The seal preferably includes a seal bead engaging the tank opening's ledge. The seal bead is preferably deformed when the seal is compressed in assembly optimizing the leak-tight construction of the joint. The mechanically formed joint provides a leak proof and resilient seal between the tank and filler pipe that exhibits good separation resistance characteristics. Rotational movement of the filler neck relative to the tank, under force, is possible without interrupting the sealing characteristics of the assembly. The joint is easily assembled and compatibility with a wide range of typical vehicle fuels is achieved.

DETAILED DESCRIPTION OF PREFERRED EMBODIMENTS

Figures 1, 3:
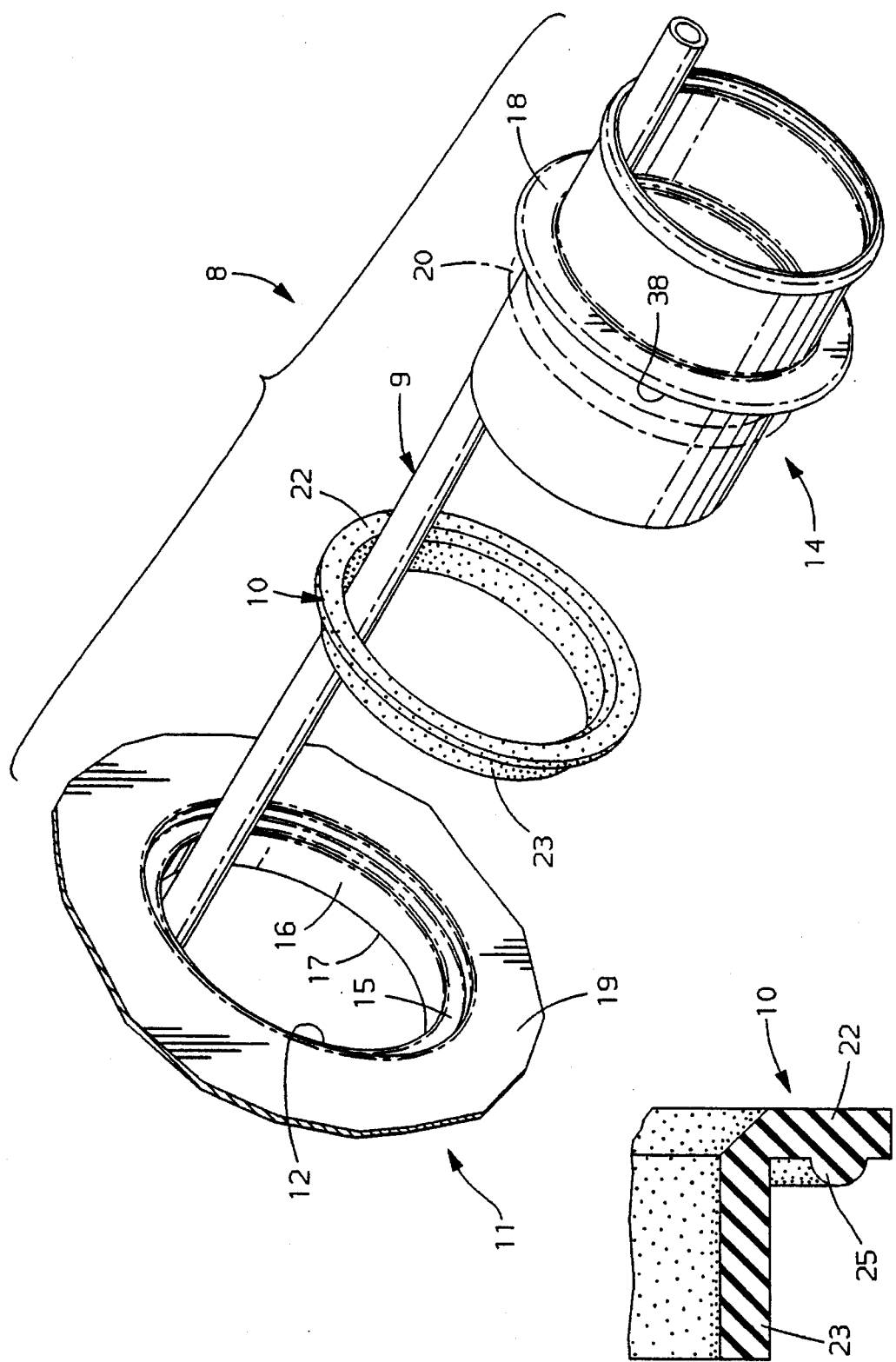
FIG. 1 is an exploded view of the tank assembly according to the present invention.
FIG. 3 is a detail sectional view of the seal of the tank assembly in FIG. 2.

Referring to FIG. 1 the elements of a solderless filler neck joint 8 are illustrated. A fuel tank wall 11 exhibits an opening 12 for admission of a filler neck 14 into the tank's interior. A filler neck is that portion of a fuel filler pipe that extends through and attaches to the fuel tank. In the preferred embodiment the filler neck 14 is a separate component part of the filler pipe. Also shown is vent 9 in the preferred embodiment extending through the filler neck 14. Alternatively vent 9 could be routed outside filler neck 14 and separately attached to the tank wall 11 similarly to filler neck 14.

The opening 12 is provided with an annular ledge 15 formed from part of the tank wall material when creating the opening 12. A flange 16 extends into the tank from the ledge 15, surrounds the opening 12 and terminates at a terminal edge 17. Seal 10 in the shape of an annular ring with a preferred L-shaped cross section engages opening 12 at ledge 15 and flange 16.

Figure 2:
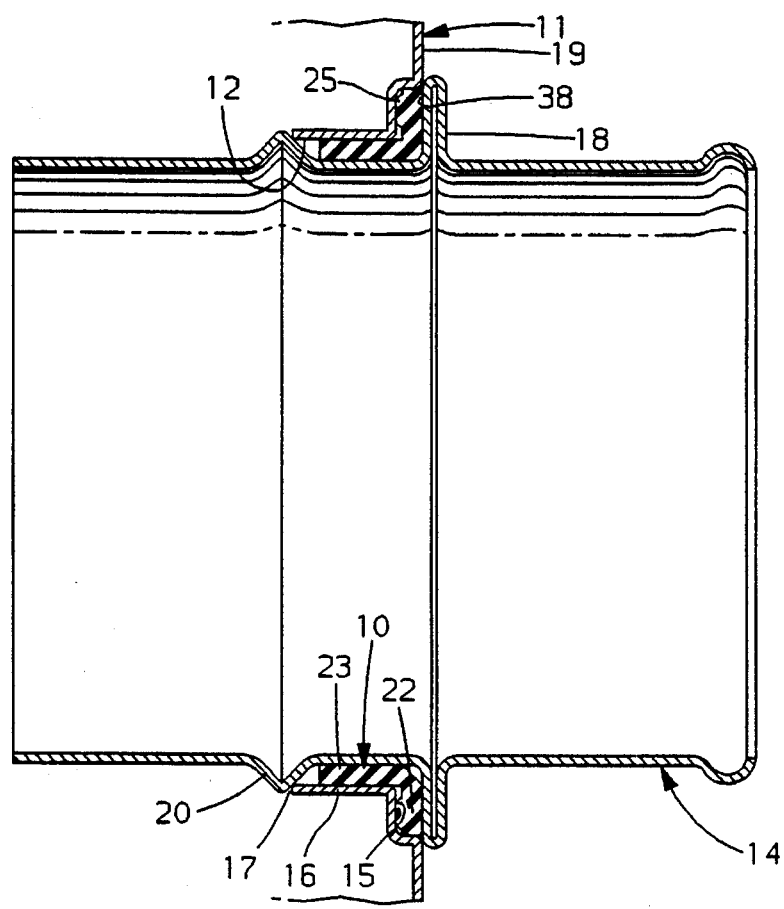
FIG. 2 is a sectional view of the tank assembly illustrating the joint.

Referring now to FIG. 2 in conjunction with FIG. 1, leg 22 of seal 10 rests in the annular seat formed by ledge 15. The remaining leg 23 of seal 10 extends into the opening 12 adjacent to the flange 16.

Extending through the opening 12 and seal 10 is the filler neck 14. The preferred form of the filler neck 14 is a section of cylindrical tubing. Formed on the wall of the tubing is an annular stop bead 18 that acts as a stop at the outside surface 19 of the tank wall 11 when the filler neck 14 is inserted into the opening 12. The stop bead 18 exhibits surface 38 parallel to tank wall 11. Formed in the wall of the tubing by mechanical deformation is continuously formed annular lock bead 20.

Lock bead 20 is formed continuously around the perimeter of filler neck 14 using bead-lock tooling after filler neck 14 is inserted through opening 12 and seal 10. The formation of lock bead 20 pulls material from the surrounding area of the filler neck 14. This in turn results in an application of a sealing force between the filler neck 14 and flange 16 against seal leg 23. The formation of lock bead 20 in the wall of filler neck 14 is sufficient, when cooperating with stop bead 18 and flange 16 to lock filler neck in position relative to tank 11. Ledge 15 imparts a degree of added strength to the area of opening 12.

During formation, lock bead 20 comes into physical contact with the terminal edge 17 of the flange 16 thereby pulling stop bead 18 toward tank wall 11 compressing leg 22 of seal 10 between the stop bead 18 and the ledge 15. After formation of lock bead 20, stop bead 18 is biased against seal leg 22. Contact between lock bead 20 and terminal edge 17 results in most of the fuel that approaches the joint being deflected away before contact with seal 10 occurs thereby enhancing the performance characteristics of the joint.

As FIG. 2 demonstrates, the joint is axisymetrical. Therefore, the joint assembly permits rotational movement of the filler neck 14, when force is applied, without interrupting the assembly's sealing ability.

FIG. 3 illustrates in cross section details of seal 10. Prior to assembly seal 10 exhibits an L-shaped cross section with legs 22 and 23. Integral with leg 22 is seal bead 25 that is preferred in providing a leak tight joint in the filler neck assembly. The seal bead contacts the ledge 15 surrounding the opening 12. As lock bead 20 is formed in the pipe 14, stop bead 18 is pulled against tank wall 11. Seal bead 25 is compressed against ledge 15. The resiliency of seal 10 acts to expand seal 10 to its preassembled dimensions thereby providing a leak tight joint between tank wall 11 and filler neck 14.

Assembly of the joint may be performed before or after construction of the fuel tank is completed. When constructing the fuel tank, opening 12 with flange 16 is formed in tank wall 11. A filler neck 14 is constructed with stop bead 18. The annular seal 10 is positioned around opening 12. Filler neck 14 is inserted through the seal 10 and opening 12 up to the stop bead 18. Bead lock tooling is then positioned in the filler neck 14 and lock bead 20 is easily formed continuously around the perimeter if filler neck 14.

Figure 4:
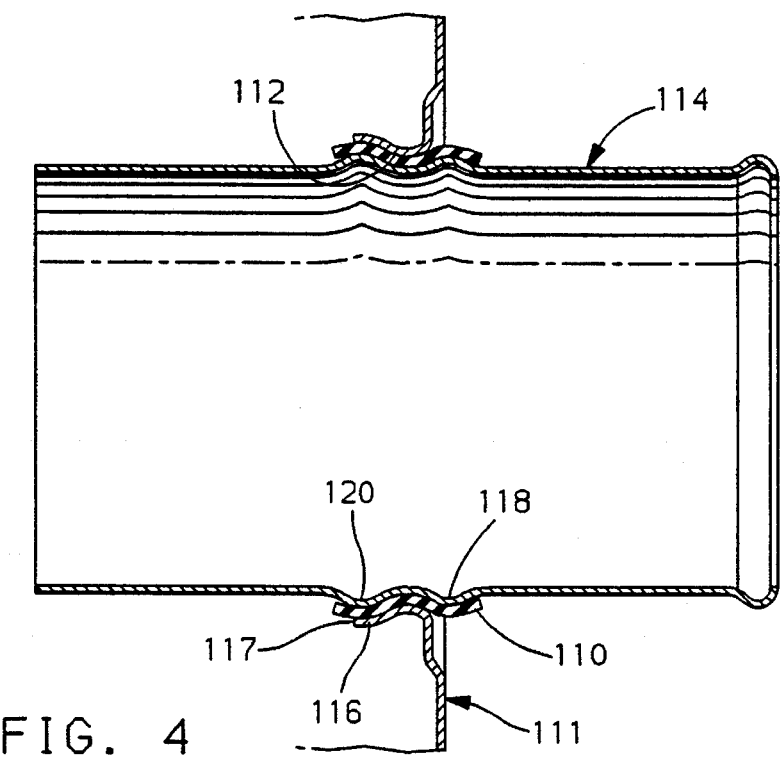
FIG. 4 illustrates a sectional view of an alternative embodiment of the present invention.

An alternative embodiment of the invention is illustrated in FIG. 4. The assembly includes a filler neck 114 having a stop bead 118 in the shape of an annular circumferential projection. The filler neck also includes lock bead 120 disposed in the opening 112 in tank wall 111 before termination of flange 116 at terminal edge 117. Therefore, the formation of lock bead 120 fixes the location of filler neck 114 within the opening and compresses seal 110 against flange 116. Seal 110 exhibits a generally rectangular cross section prior to assembly. After assembly the seal conforms to the adjacent surface contour of filler neck 114 and flange 116.

Figure 5:
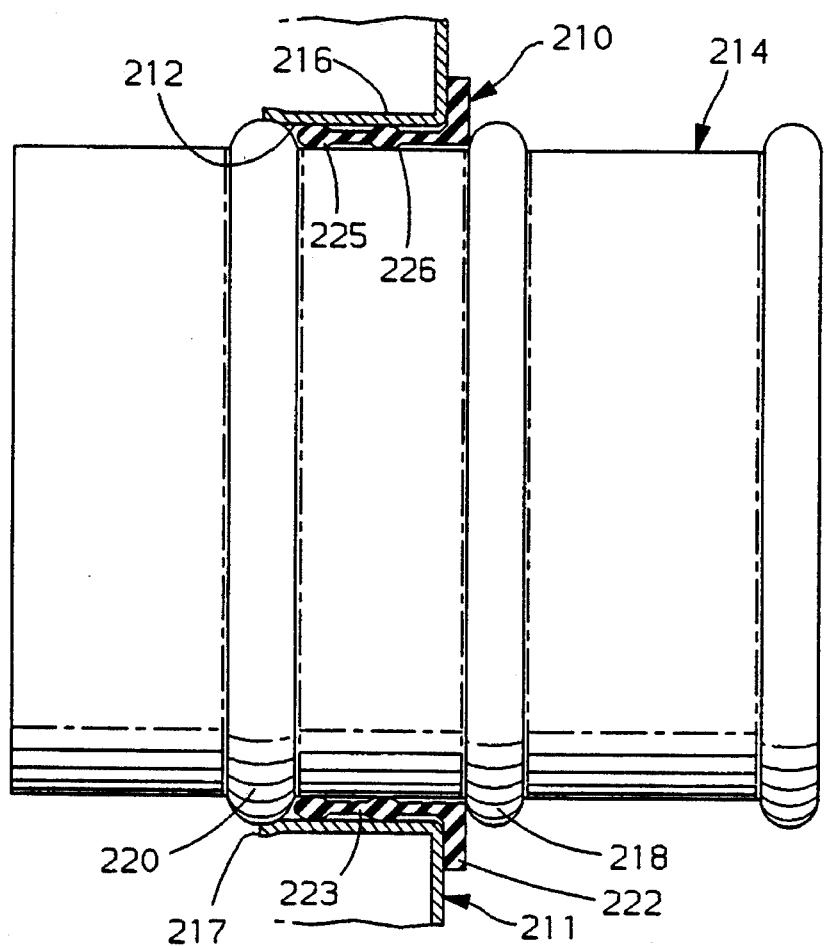
FIG. 5 illustrates a sectional view of another alternative embodiment of the present invention.
Figure 6:
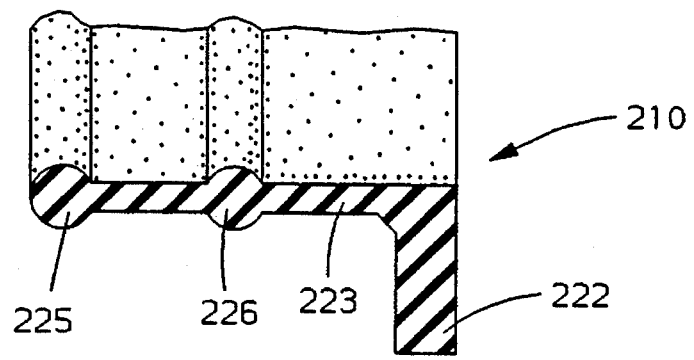
FIG. 6 illustrates a detail sectional view of the seal of FIG. 5.

FIG. 5 illustrates another alternative embodiment of the present invention. Filler neck 214 extends through opening 212 in tank wall 211. Referring to FIG. 6 along with FIG. 5, stop bead 218 contacts leg 222 of L-shaped cross section seal 210. Lock bead 220 when formed contacts terminal edge 217 of flange 216. Seal beads 225 and 226 are formed in leg 223 of seal 210 and are disposed between filler neck 214 and flange 216 in opening 212.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A filler neck assembly comprising:

a tank having a wall with an opening through the wall;

a pipe extending through the opening in the tank including an annular stop bead projecting radially outward from the pipe outside the tank wall and an annular lock bead projecting radially outward from the pipe formed inside the tank wall to lock the pipe to the tank, the annular stop bead and the annular lock bead in cooperation providing the sole means for securing the pipe within the opening; and a resilient annular seal interposed in the opening between the tank wall and the pipe wherein limited rotational movement of the filler neck relative to the tank is possible while maintaining the filler neck assembly in a securely sealed condition.

2. A filler neck assembly comprising:

a tank having a wall with an inside surface and an outside surface and having an opening through the wall;

a flange having a terminal edge projecting from the wall inside the tank encircling the opening;

a pipe extending through the opening in the tank including an annular stop bead projecting radially outward from the pipe adjacent to the outside surface of the wall and an annular lock bead projecting radially outward from the pipe formed adjacent to the terminal edge of the flange inside the tank, the pipe's location within the opening secured solely by the stop bead in relation to the outside surface of the tank wall and the lock bead in relation to the terminal edge of the flange; and a resilient annular seal interposed between the flange and the pipe the resilient annular seal compressed between the pipe and the flange wherein a fluid-tight seal is provided by the interpositioning of the seal between the pipe and the flange in cooperation with the formation of the lock bead wherein limited rotational movement of the filler neck relative to the tank is possible while maintaining the filler neck assembly in a securely sealed condition.

3. A filler neck assembly according to claim 2 further comprising a vent extending through the pipe, the vent and the pipe defining a fuel conduit therebetween.

4. A filler neck assembly according to claim 2 wherein the seal includes a first annular leg disposed between the pipe and the flange and a second annular leg disposed between the stop bead and the outside surface of the tank wall.

5. A filler neck assembly according to claim 4 wherein the annular lock bead extends continuously around the pipe.

6. A filler neck assembly comprising:

a fuel tank having a wall with an opening through the wall;

a flange extending inwardly around the perimeter of the opening terminating at a terminal edge including an annular ledge formed at a juncture between the tank wall and the flange;

a pipe extending through the opening including an annular stop bead projecting from the pipe having a surface parallel to the tank wall thereby preventing the pipe from moving inwardly;

a seal interposed between the pipe and the flange including a first annular leg located between the ledge and the surface of the annular stop bead the first annular leg including an annular seal bead contiguous with the ledge and a second annular leg located between the pipe and the flange; and an annular lock bead formed in the pipe contacting the terminal edge of the flange thereby providing the sole means for preventing the pipe from moving outwardly and biasing the surface of the annular stop bead against the first annular leg to provide a fluid-tight seal.

7. A method of assembling a fuel tank filler neck joint which includes a fuel tank including a wall, a filler neck pipe and an annular seal comprising the steps of:

a. forming a circular opening in the fuel tank wall with an annular flange surrounding the opening;

b. forming an annular stop bead projecting radially outward around the filler neck pipe;

c. positioning the annular seal around the opening;

d. inserting the filler neck pipe through the annular seal and the opening wherein the seal is interposed between the flange of the opening and the filler neck pipe and the stop bead is positioned adjacent to the tank wall;

e. forming an annular lock bead projecting radially outward continuously around the filler neck pipe inside the tank wall thereby compressing the annular seal between the filler neck pipe and the tank wall and providing the sole means to lock the pipe in position relative to the tank, wherein limited rotational movement of the filler neck pipe relative to the fuel tank is possible while maintaining the fuel tank filler neck joint in a securely sealed condition.

8. A method of assembling a fuel tank filler neck joint which includes a filler neck pipe, a fuel tank having a wall and an annular seal with a first and a second leg comprising the steps of:

a. forming a circular opening in the fuel tank wall including a flange extending inwardly around the perimeter of the opening;

b. forming an annular stop bead projecting radially outward around the filler neck pipe;

c. positioning the annular seal in the opening with the first leg adjacent to the tank wall and the second leg adjacent to the flange;

d. inserting the filler neck pipe through the opening and the annular seal wherein the stop bead is adjacent to the first leg of the seal;

e. forming an annular lock bead projecting radially outward continuously around the filler neck pipe inside the tank, wherein limited rotational movement of the filler neck pipe relative to the fuel tank is possible while maintaining the fuel tank filler neck joint in a securely sealed condition causing the stop bead to engage the leg of the seal to provide a leak-tight seal.

* * * * *